United States Patent [19]

Zimmermann et al.

[11] Patent Number: 5,346,151
[45] Date of Patent: Sep. 13, 1994

[54] SEVERING A WEB

[75] Inventors: Clifton Zimmermann, Karlsruhe; Heribert Kuerten, Neustadt, both of Fed. Rep. of Germany

[73] Assignee: BASF Aktiengesellschaft, Ludwigshafen, Fed. Rep. of Germany

[21] Appl. No.: 35,658

[22] Filed: Mar. 23, 1993

[30] Foreign Application Priority Data

Mar. 25, 1992 [DE] Fed. Rep. of Germany ....... 4209630

[51] Int. Cl.⁵ .......................................... B65H 19/26
[52] U.S. Cl. .................................. 242/521; 83/16; 225/93.5; 242/526
[58] Field of Search ............... 242/56.8, 56 R, 56 A, 242/56.6; 83/16; 225/2, 93.5, 93

[56] References Cited

U.S. PATENT DOCUMENTS

| | | | |
|---|---|---|---|
| 3,410,979 | 11/1968 | Larsson | 83/16 X |
| 3,526,162 | 9/1970 | Willcox | 83/16 |
| 3,791,603 | 2/1974 | Lenius | 242/56 A |
| 3,878,978 | 4/1975 | Martinek | 225/93.5 X |
| 4,515,321 | 5/1985 | Kahlman | 242/56 R |
| 5,092,533 | 3/1992 | Gangemi | 242/56 R |

*Primary Examiner*—John M. Jillions
*Attorney, Agent, or Firm*—Keil & Weinkauf

[57] ABSTRACT

A moving web (1) is severed, after the intended length has been wound up, by fracture mechanical crack propagation starting from perforation cuts introduced by means of a laser system (9–11) into a web material embrittled by cooling (8) at the severance location.

4 Claims, 1 Drawing Sheet

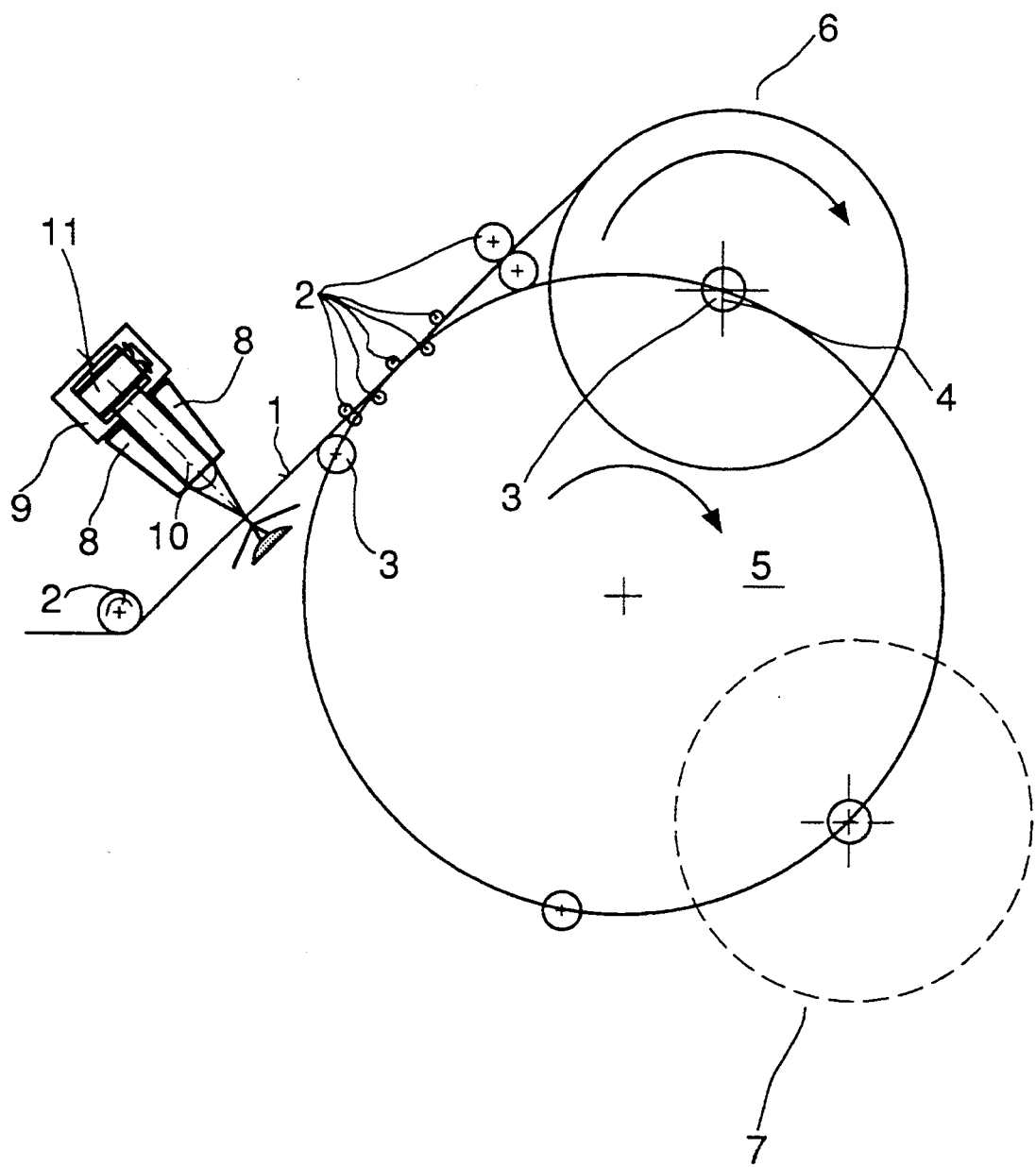

SEVERING A WEB

The present invention relates to a method and apparatus for severing a moving web of material, the apparatus having a driven means and a tension-generating drive means for the web and guide rollers therebetween.

Hitherto it has been customary to sever a continuous web of material with the aid of a mechanically driven fly cutter. The new lead end of the web is applied to a new, already rotating core. The sweep of the fly cutter into the web causes a local deflection of the web, which results in bending vibrations of the newly created ends. This causes problems when applying the new lead end to the new core, and creases may result. Furthermore, at high web speeds it is increasingly difficult to activate the cutter in time.

It is an object of the present invention to provide a method and apparatus for severing a continuous web of material where impairment of the web material and of the path of the web is ruled out, ie. where mechanical cutting is avoided.

We have found that this object is achieved by a method which comprises causing the location of the web where it is to be severed to become embrittled transversely to the direction of movement of the web and introducing into the embrittled severance location a plurality of perforation cuts in such a way that the tension of the web is sufficient to initiate cracks which start from the perforation cuts and propagate rapidly.

The apparatus for carrying out the method is of the type described at the beginning and comprises according to the invention a nozzle arrangement which extends over the width of the web and is connectable to a cooling medium source, and a laser light source whose light is focused by at least one lens onto the web at the location impinged by the nozzle arrangement or shortly downstream thereof.

The method and apparatus of the invention will now be more particularly described by way of example with reference to an illustrative embodiment depicted schematically in the drawing which shows a side view of the cutting and winding system of the present invention.

A continuously produced web 1 is supplied via deflecting and guide rollers 2 to a reel core 3 which is driven by an electric motor 4 and serves as drive means for the web. Once the intended length of web has been wound onto the core it is severed and the new lead end formed is adhesively applied to a new reel core which has already been brought to the speed of the web. The adhesion can be achieved by moistening the web or by means of electrostatic charges. It can similarly be augmented by heating the reel core surface.

For a smooth reel core change it is advantageous to dispose the new reel core in the transport path of the web while winding onto the preceding core is still in progress. For this purpose it is advantageous to employ an incrementally rotatable table 5 on which there are arranged a plurality of motor drivable reel cores 3 in such a way that in every working position of the rotatable table the next reel core is at least closely adjacent to the web. After the web has been severed and the new lead end has been attached to the next reel core, the table rotates into the next position, so that the newly equipped reel core arrives at the winding station 6 and the wound core at the removal station 7.

The severing of web 1 according to the invention directly upstream of the new reel core is effected according to fracture mechanical principles by causing the location of the web where it is to be severed to become embrittled transversely to the direction of movement of the web and introducing into the embrittled severance location a plurality of perforation cuts in such a way that the web tension $\sigma$ created by the winding core 3 is sufficient to initiate cracks or brittle fractures which start from the perforation cuts and propagate rapidly. For a given tension $\sigma$ the necessary (total) perforation cut length a is given by the fracture mechanical equation $$K_{IC} = \sigma \sqrt{2} \, \pi a$$

where $K_{IC}$ is the stress intensity factor, a constant of the web material, and a is the length of the perforation cuts.

The cracks always propagate perpendicularly to the tension, ie. the web direction, and within a few millimeters attain their material-specific terminal velocity. Above the embrittlement temperature, ie. in the plastic range, this velocity is about 10 m/sec in the case of metallic or organosynthetic materials. Below the embrittlement temperature, ie. in the brittle range, the cracks reach the Raleigh wave velocity, about 1,000–1,500 m/s in the case of the abovementioned materials.

The embrittling of the web material at the severance location is effected by means of a jet of liquefied gas, preferably nitrogen, emerging from a nozzle 8 which extends across the width of the web 1. The exit time must be made short so that only a narrow strip around the location where the web is to be severed is embrittled.

The perforation cuts are introduced into the embrittled severance location with the aid of a laser 9 whose light is focused onto the web by a plurality of focusing lenses 10 distributed across the width of the web, the light from the laser 9 being deflected to the individual lenses 10 by a rotating polygonal mirror 11.

In an advantageous embodiment of the abovedescribed severing means, the focusing lenses 10 are enclosed by two nozzles 8.

The edge of a brittle fracture is excellent in quality compared with mechanically-effected cuts and is produced at a very high severing speed. A web 1 m in width is severed in <1 ms. No external mechanical forces are involved. On the contrary, the force for severing the material is supplied by the tension of the web, so that no bending waves are produced. Furthermore, the cooling of the web in the severance region has the effect of stiffening the ends of the cut; creases are therefore not possible.

If the embrittlement temperature of the material is below 0° C. and the material was cooled down sufficiently, the cut ends will very rapidly attract moisture from the atmosphere to become coated with a layer of ice. If the thus ice-coated end arrives on the new, possibly heated reel core, the thawing ice will act as an adhesive. In this case additional adhesion promoters would be unnecessary.

We claim:

1. A method for severing a moving web of material, which comprises causing the location of the web where it is to be severed to become embrittled transversely to the direction of movement of the web and introducing into the embrittled severance location a plurality of perforation cuts in such a way that the tension of the web is sufficient to initiate cracks which start from the perforation cuts and propagate rapidly.

2. Apparatus for carrying out the method of claim 1, having a driven means and a tension-generating drive means (3, 4) for the web (1) and guide rollers (2) therebetween, comprising a nozzle arrangement (8) which extends over the width of the web (1) and is connectable to a cooling medium source, and a laser light source (9) whose light is focused by at least one lens (10) onto the web at the location impinged by the nozzle arrangement or shortly downstream thereof.

3. Apparatus as claimed in claim 2, wherein there are provided a plurality of focusing lenses (10) which are distributed across the web width and impingeable successively by the laser light by means of a rotatable polygonal mirror (11).

4. Apparatus as claimed in claim 2, wherein the drive means is one of a plurality of motor drivable reel cores (3) arranged on an incrementally rotatable table (5) in such a way that in every working position of the rotatable table there is between the laser arrangement (9–11) and the winding core (3, 6) a further reel core (3) that touches the web (1).

* * * * *